US011868997B2

United States Patent
Lakshmanan et al.

(10) Patent No.: US 11,868,997 B2
(45) Date of Patent: *Jan. 9, 2024

(54) SECURE PAYMENTS USING A MOBILE WALLET APPLICATION

(71) Applicant: Minkasu, Inc., Fremont, CA (US)

(72) Inventors: Subramanian Lakshmanan, San Jose, CA (US); Anbarasan P. Gounder, Fremont, CA (US); Naveen Doraiswamy, Fremont, CA (US)

(73) Assignee: Minkasu, Inc, Fremont, CA (US)

( * ) Notice: Subject to any disclaimer, the term of this patent is extended or adjusted under 35 U.S.C. 154(b) by 537 days.

This patent is subject to a terminal disclaimer.

(21) Appl. No.: 17/095,080

(22) Filed: Nov. 11, 2020

(65) Prior Publication Data

US 2021/0065173 A1    Mar. 4, 2021

Related U.S. Application Data

(63) Continuation of application No. 14/695,016, filed on Apr. 23, 2015, now Pat. No. 10,861,009.

(Continued)

(51) Int. Cl.
*G06Q 20/38*     (2012.01)
*G06Q 20/32*     (2012.01)
*G06Q 20/02*     (2012.01)

(52) U.S. Cl.
CPC ......... *G06Q 20/3829* (2013.01); *G06Q 20/02* (2013.01); *G06Q 20/3226* (2013.01); *G06Q 20/3823* (2013.01)

(58) Field of Classification Search
CPC ............... G06Q 20/3829; G06Q 20/02; G06Q 20/3226; G06Q 20/3823
See application file for complete search history.

(56) References Cited

U.S. PATENT DOCUMENTS 7,676,433 B1    3/2010    Ross et al.
7,920,851 B2    4/2011    Moshir et al.
(Continued)

FOREIGN PATENT DOCUMENTS

WO    2011146778 A1    11/2011
WO    2013179038 A1    12/2013

*Primary Examiner* — Steven S Kim
*Assistant Examiner* — Zesheng Xiao
(74) *Attorney, Agent, or Firm* — PATENT LAW WORKS LLP

(57) ABSTRACT

A payment system implemented on a mobile device authenticates transactions made via the mobile device. The mobile device generates a public-private key pair and receives an authenticating input from a user of the device. The public key is sent to a secure payment system, and the authenticating input is used to generate a symmetric key that encrypts the private key. After a transaction is initiated, the mobile device receives an authenticating input from the user. The symmetric key is generated from the authenticating input and the mobile device attempts to decrypt the private key from the encrypted private key using the symmetric key generated by the user's input. The decrypted key is used to sign a transaction authorization message which is sent to the secure payment system, along with payment information, which can verify the signed message via the public key. Additional techniques related to secure payments are also disclosed.

27 Claims, 7 Drawing Sheets

Related U.S. Application Data

(60) Provisional application No. 61/983,238, filed on Apr. 23, 2014.

(56) References Cited

U.S. PATENT DOCUMENTS

| | | |
|---|---|---|
| 8,307,210 B1 | 11/2012 | Duane |
| 8,555,083 B1 | 10/2013 | Nanda et al. |
| 8,577,803 B2 | 11/2013 | Chatterjee et al. |
| 2002/0186838 A1 | 12/2002 | Brandys |
| 2002/0198848 A1 | 12/2002 | Michener |
| 2003/0033537 A1 | 2/2003 | Fujimoto et al. |
| 2003/0074562 A1 | 4/2003 | Hansen et al. |
| 2003/0101346 A1 | 5/2003 | Barron et al. |
| 2003/0159041 A1 | 8/2003 | Yokota et al. |
| 2003/0182566 A1 | 9/2003 | Kohara et al. |
| 2004/0111379 A1 | 6/2004 | Hicks et al. |
| 2005/0028064 A1 | 2/2005 | Thomas et al. |
| 2007/0192601 A1 | 8/2007 | Spain et al. |
| 2007/0245148 A1 | 10/2007 | Buer |
| 2007/0255943 A1* | 11/2007 | Kern ............... H04L 9/0894 713/155 |
| 2008/0017710 A1 | 1/2008 | Silverbrook et al. |
| 2009/0048979 A1 | 2/2009 | Al-Herz et al. |
| 2009/0138727 A1 | 5/2009 | Campello de Souza |
| 2009/0164796 A1 | 6/2009 | Peirce |
| 2009/0214037 A1 | 8/2009 | Tuttle |
| 2010/0034434 A1 | 2/2010 | von Mueller et al. |
| 2011/0137803 A1 | 6/2011 | Willins |
| 2011/0161233 A1 | 6/2011 | Tieken |
| 2011/0252243 A1* | 10/2011 | Brouwer ............. G06F 21/62 713/189 |
| 2011/0302646 A1 | 12/2011 | Ronda et al. |
| 2012/0166333 A1 | 6/2012 | von Behren et al. |
| 2013/0054320 A1 | 2/2013 | Dorso et al. |
| 2013/0226812 A1 | 8/2013 | Landrok et al. |
| 2014/0164243 A1 | 6/2014 | Aabye et al. |
| 2015/0295921 A1 | 10/2015 | Cao |
| 2016/0261408 A1 | 9/2016 | Peddada et al. |

* cited by examiner

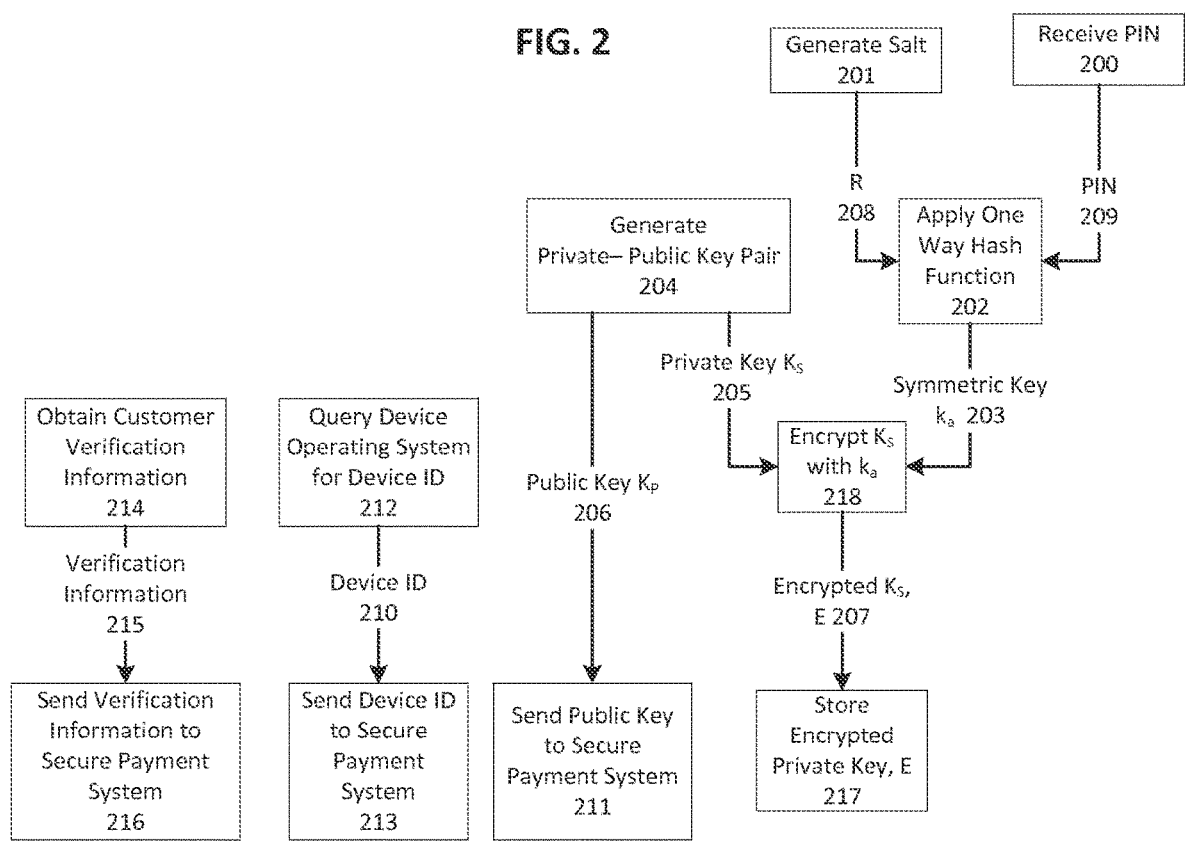
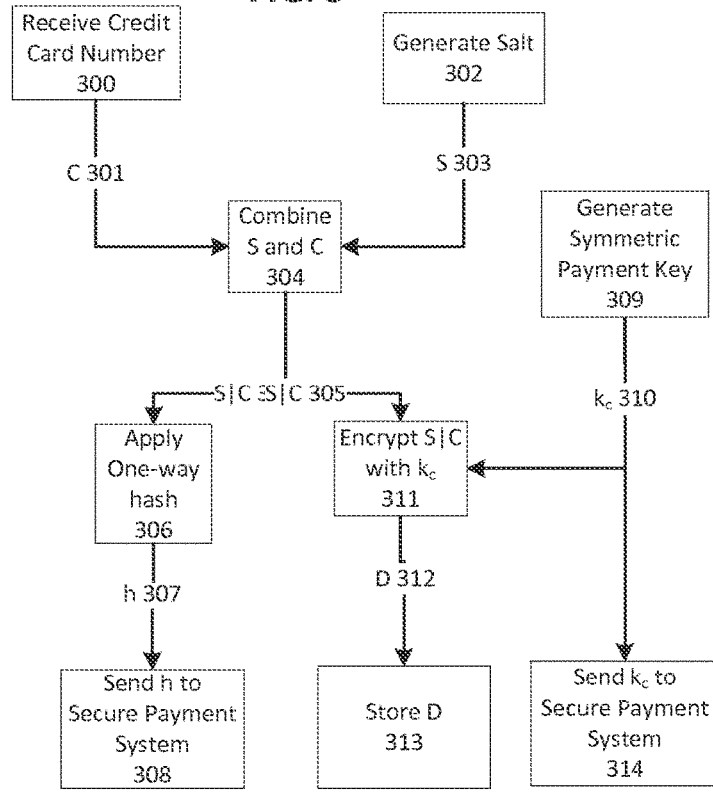

SECURE PAYMENTS USING A MOBILE WALLET APPLICATION

CROSS REFERENCE TO RELATED APPLICATIONS

This application is a continuation of U.S. patent application Ser. No. 14/695,016, filed Apr. 23, 2015, and entitled "Secure Payments Using a Mobile Wallet Application" which claims the benefit of U.S. Provisional Application No. 61/983,238, filed Apr. 23, 2014, which is incorporated by reference in its entirety.

BACKGROUND

Field

This disclosure relates generally to secure payments between a customer and a merchant and more specifically to authorizing a transaction using a cryptographically signed message.

Description of the Background Art

Today, credit and debit cards are a widely used service, providing a valuable and convenient payment option that consumers depend on. Many consumer purchases are performed using a credit or debit card as a payment method. Credit and debit cards further provide a convenient means for purchasing goods and services over a network, which would be inconvenient or impossible using physical payment means.

However, a consumer must contend with the inconvenience of fragmented payment systems which only operate on select platforms. For example, a consumer might use an online payment system for online purchases, but a card reader for a purchase in a brick and mortar store. Similarly, mobile payment systems are often limited to certain mobile devices and do not generally support online purchases. Such fragmentation is undesirable from a user standpoint and makes it difficult for retailers to support every system. Often, existing virtual wallets rely on technology such as NFC to make purchases in brick and mortar stores which requires retailers to retrofit existing POS systems. As a result, retailers have been resistant to supporting virtual wallets as a payment method.

Furthermore, existing payment methods distribute responsibility for security across many different systems. The distributed nature of security allows malicious individuals multiple avenues of attack with which to procure sensitive consumer financial data. It is challenging for a customer to assess the security of the systems which process their sensitive information over the course of a transaction. These existing systems have been shown to be vulnerable to attack, and weaknesses have been exploited in existing systems to reveal customer payment information to attackers.

The customer is forced to either entrust the security of their data to these multiple security systems, of which they are very unlikely to have knowledge of, or to forego the convenience and advantages of credit cards. A single unified system that mitigates the insecurities inherent in a distributed system would be advantageous to consumers who do not want to undertake financial loss or the tedious process of verifying fraud as well as to merchants who are adverse to the loss of trust and heavy financial cost that results from a large scale security breach.

In addition to exposing sensitive consumer information, credit card transactions are vulnerable to fraud which results in a major cost to credit card companies, banks that issue the credit cards, and merchants. Present systems do not provide a reliable and simple way for merchants and credit card companies to prevent fraud or to effectively address allegations of fraud. Also, merchants and credit card companies have little recourse to prove or disprove allegations by a consumer that a transaction was made fraudulently.

SUMMARY

A payment system, implemented on a mobile device of a customer, provides a secure means for the customer to make payments via a credit or debit card at both brick-and-mortar and online merchants, without being forced to entrust their sensitive financial information to a merchant or exposing themselves to the security vulnerabilities intrinsic to storing the financial information on the cloud. In some embodiments, a payment system stores the payment information of a customer in a distributed way such that the information is inaccessible without access to data on both a secure payment system and that customer's mobile device.

Additionally, a payment system can allow a user to bind an identifier, uniquely associated with a mobile device or a customer, with a public key by creating a public key certificate. Furthermore, some embodiments provide a means for merchants to obtain a cryptographically signed message from the customer device which can be verified using the public key which is bound to the customer's identity. The payment system can also support remote, time-deferred, recurring, redirected, and multi-party-approved transactions.

BRIEF DESCRIPTION OF THE DRAWINGS

FIG. 2 is a block diagram illustrating a method for generating a pair of private and public keys, and storing an encrypted version of the private key on a customer device in accordance with some embodiments.

FIG. 3 is a block diagram illustrating a method for storing an encrypted salted credit card number on a customer device and storing its corresponding encryption key on a secure payment system in accordance with some embodiments.

The figures depict various embodiments of the present disclosure for purposes of illustration only. One skilled in the art will readily recognize from the following discussion that alternative embodiments of the structures and methods illustrated herein may be employed without departing from the principles described herein.

DETAILED DESCRIPTION

Network Infrastructure

Figure 1:
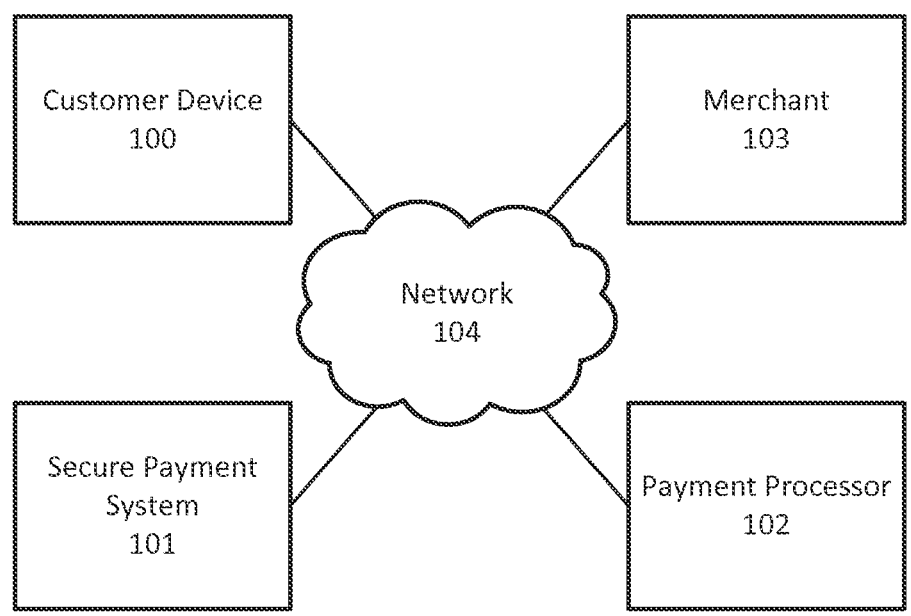
FIG. 1 is a block diagram of a network infrastructure configured to process transactions in accordance with some embodiments.

FIG. 1 is a block diagram of a network infrastructure configured to process transactions in accordance with some embodiments. The network infrastructure comprises a customer device 100, a merchant 103, a secure payment system 101, and a payment processor 102, all connected via a network 104. In some embodiments, a transaction is initiated when a merchant 103 provides transaction details to the secure payment system 101. The secure payment system 101 provides a transaction ID to the merchant 103 which in turn provides the transaction ID to the customer device 100. The transaction ID may also be received directly by the customer device 100 from the merchant 103. The customer device requests and receives the transaction details from the secure payment system 101. The customer device 100 then authorizes the transaction and provides payment information to the secure payment system 101. The secure payment system 101 provides the payment processor 102 with the necessary information to process the transaction. Optionally, a transaction receipt can be provided to the customer device 100 and a transaction authorization message can be provided to the merchant 103. In some embodiments, the merchant 103 is be a second customer device and may provide user-user payments. An application installed on the second customer device provides an option to initiate a transaction, and transaction details, such as payment amount, can be defined by the user of the second customer device. The application can allow for the display of a QR code on the screen of the second customer device, which allows for the first customer device 100 to receive the transaction details by scanning the QR code with a camera on the first customer device 100 and decoding. The second device may also transmit the transaction ID to the first device by any other method.

In some embodiments, before a transaction can be processed, the customer device 100 is initialized. In some embodiments, initialization can include downloading a mobile application to the customer device 100 and receiving user-input payment information to the mobile application. The payment information may differ based on the type of payment method. For example, the payment information can include a credit card number, a debit card number, a bank account number, an expiration date of a payment card, an identification number for a gift card, or any other sensitive information used to process a transaction. Embodiments described herein that describe using a credit card number can also use any of these other forms of payment information, or some combination of forms of payment information. Initialization can also include generating, via the mobile application, a private-public key pair, wherein the public key is provided to the secure payment system 101 and the private key is used by the customer device 100 to sign transaction authorization messages which can be verified by the secure payment system 101 using the public key. Initialization can further include providing customer verification information or a device ID to the secure payment system 101 in order to be verified and bound to the public key. These steps and processes for authorizing a transaction are further described below.

Initialize Customer's Private Signing Key

FIG. 2 is a block diagram illustrating one such embodiment of a method for generating a pair of private and public keys, and storing an encrypted version of the private key on the customer device 100. Initially, a customer provides an authenticating input. This authenticating input is later provided by the customer during a transaction to verify that the customer is the same customer that previously provided the authenticating input. This is used to authorize transactions. In one example, the authenticating input is a personal identification number (PIN) entered by the customer. Other authenticating inputs may also be used, such as a password or passcode, biometric information (e.g., finger or eye scans), or any other information that may be reproducibly generated by the customer. For convenience throughout this disclosure, a PIN is used as an example of the customer identifying information, though any such suitable customer identifying information may be used.

In this example method for initializing a transaction, the customer device 100 receives 200 a PIN 209. Receiving 200 the PIN 209 can comprise allowing a user to input the PIN 209, via an input on the customer device 100. In some embodiments, the user is restricted from entering a PIN 209 deemed to be insecure, such as very common PINs like "1234" or "0000" or a PIN that consists of the user's birthday. As noted above, although, this embodiment describes a PIN; many types of authenticating inputs can be used instead of, or in addition to, a PIN. The authenticating input can comprise or be generated from at least one of a fingerprint, a facial recognition profile, an unlock pattern, and a password. A salt R 208 is generated 201, via a random number generator. A salt is a random value that can be used as an input to a hash or encryption algorithm along with sensitive data to prevent an attacker from utilizing a rainbow attack to recover the sensitive data from encrypted data or a hash. A hash is generated by applying 202 a one way hash function to the salt, R 208, and the PIN 209. The hash is used as a symmetric key $k_\alpha$ 203. For best security, the hashing function should have an output that is probabilistically uniform, or near uniform, given inputs that are uniformly distributed. This increases the difficulty of using a brute force attack to guess the symmetric key $k_\alpha$ 203.

A random number generator generates 204 a private-public key pair. A private-public key pair comprises two encryption keys, a private key $K_S$ 205 and a public key $K_P$ 206. A private key cannot be derived from the public key. The private key-public key pair can be produced via the RSA cryptosystem, the Digital Signature Algorithm (DSA), or any other public-private key cryptosystem suitable for cryptographic signing. The private key $K_S$ 205 is encrypted 218 with the symmetric key $k_\alpha$ 203 to produce the encrypted private key E 207. The encrypted private key E 207 and the salt R 208 are stored 217 on the customer device 100. The public key $K_P$ 206 is sent 211 to the secure payment system 101. In this way, the authenticating input is used to generate a symmetric key that may be used to store and subsequently retrieve the private key. As described further below, when making a purchase, the user may enter the authenticating input, which is used to re-generate the symmetric key and decrypt the private key. In this way, the private key may only be decrypted and used to sign a purchase when the user provides the proper authenticating input.

In some embodiments, the public key $K_P$ 206 is registered to a device ID 210 or verification information 215 at the secure payment system 101. Verification information 215 can constitute a phone number or a customer ID, such as a customer name, a social security number, or customer financial information. The device ID 210 can be obtained by querying 212 the operating system of the device for the device ID 210 and can be sent 213 to the secure payment system 101 along with the public key $K_P$ 206. In some embodiments, the device ID 210 is an identifier unique to each customer device 100 which is generated by the operating system of the customer device 100. The customer device 100 may send any access token necessary for the secure payment system 101 to send a push notification to the customer device 100, along with the device ID 210. The secure payment system 101 then sends a device verification message to the device using the push notification services built into the customer device 100 operating system. The device verification message can contain a one-time random number encrypted using the customer's public key $K_P$ 206. The customer device 100 then receives the customer verification message, decrypts the number using the private key $K_S$ 205 and sends back the original random number to the secure payment system 101. The secure payment system 101 then deems the customer device 100 as verified for the customer and associates the public key $K_P$ 206 with the device ID.

In addition to the device ID 210, verification information 215 can be obtained 214 from the customer. This verification information 215 can then be sent 216 to the secure payment system 101. In some embodiments, the customer's phone number is verified, so that that the public key $K_P$ 206 is associated by the secure payment system 101 with the specific phone number, and consequently with the specific customer. One such method for verifying the phone number of the customer device 100 constitutes asking the customer to input the mobile device phone number or obtaining the device number through a command to the operating system. The phone number is then sent to the secure payment system 101. The secure payment system 101 can then send a text message to the received phone number. The text message can contain a random number encrypted using the public key $K_P$ 206. Alternately, the encrypted random number can be transmitted via a phone call. The encrypted random number can be viewed by the user and typed into an application or can be retrieved automatically by the application. The random number is then decoded using the private key, $K_S$ 205, and sent back to the secure payment system 101, which then deems the phone number as verified and associates the public key $K_P$ 206 with the phone number. The phone number can also be verified in the other direction. I.e., the customer device 100 can receive the encrypted random number from the secure payment system 101 and send a text message or phone call with the decoded random number to a phone number that the secure payment system 101 is configured to receive.

In some embodiments, the customer ID is verified, so that that the public key $K_P$ 206 is associated by the secure payment system 101 with a specific customer ID. The customer ID can constitute many things such as a name of a customer, a social security number, or any identifying information that can be mapped to a customer. The customer can be asked to input details into the customer device 100 about their identity, such as a full name, address, part of a social security number, or financial history, which is then sent secure payment system 101. The secure payment system 101 can then pose questions to the customer to verify this identity. In some embodiments, these questions can be related to the customer's financial history and can be obtained from an identity verification service or a credit reporting agency. The answers can also be verified using these services. The answers to these questions can be signed using the private key $K_S$ 205 and sent to the secure payment system 101 which verifies the signature and then deems the customer as verified and associates the public key $K_P$ 206 with the customer ID.

In some embodiments, the public key $K_P$ 206 is bound, via the issuance of a public key certificate, to the customer's identity, wherein the customer's identity is established by at least one of a full name, an address, part of a social security number, a phone number, or a device ID. The public key certificate can include this identifying information. This information can be included in the public key certificate as plaintext or a hashed version of the information can be included in the public key certificate. In some embodiments, this public key certificate is provided by the secure payment system 101 to the merchant 103 along with a signed message that authorizes a transaction, which will allow the merchant 103 to verify and prove that the given customer did provide authorization for a transaction. The secure payment system 101 can sign the public key certificate with its own private key, wherein the public key corresponding to the secure payment system's private key is, in turn, certified by a trusted certificate authority.

The un-encoded private key, $K_S$ 205, the symmetric key $k_\alpha$ 203 and the PIN 209 are typically deleted from the volatile and non-volatile memory of the customer device 100. In this way, the private key $K_S$ 205 may not be readily accessed on the customer device 100. As described further below, a user must re-enter the correct authenticating input to generate a symmetric key $k_\alpha$ 203 and decrypt the stored encrypted private key E 207 in order to retrieve the private key $K_S$ 205.

Store the Credit Card Number

FIG. 3 is a block diagram illustrating a method for storing an encrypted salted credit card number D 312 on the customer device 100 and storing its symmetric payment key $k_c$ 310 on the secure payment system 101, in accordance with some embodiments. Though described for convenience as relating to a credit card number, any payment method, such as a credit card number, a debit card number, a bank account number, an identification number for a gift card, or any other sensitive information used to process a transaction, may be used as payment information in varying embodiments. Thus, the references to credit card numbers herein may be applied to any other payment method. This method includes receiving 300 a credit card number C 301 which can comprise allowing a user to type in a credit card number C 301. Alternately, receiving 300 a credit card number C 301 can comprise scanning a card with a camera and applying optical character recognition (OCR) techniques to obtain the credit card number C 301. Receiving 300 a credit card number C 301 can also comprise receiving the credit card number C 301 from a network 104. It can be required that the ownership of the credit card be verified. This can be done by performing random zero-sum transactions and asking the customer to verify the amounts or asking for additional authentication information such as an address or a portion of a social security number. The requirements for authenticating the credit card number C 301 can be received, by the secure payment system 101 from the bank or other financial institution that oversees the credit card. The credit card can be associated with a credit card ID that enables the customer device 100 to store and select multiple credit card or debit card numbers.

The customer device 100 generates 302 a random salt S 303 via a random number generator. The salt S 303 and the credit card number C 301 are combined 304 to produce the salted credit card number S|C 305. In one embodiment, combining 304 constitutes appending the credit card number C 301 to the salt S 303. In some embodiments, the means of combination is such that the credit card number can be extracted from the salted credit card number S|C 305 by a system without knowledge of either the salt S 303, or the credit card number C 301. The salted credit card number S|C 305 is hashed by applying 306 a one-way cryptographically secure hash function to produce the hashed salted credit card number h 307. The hash function can be any hashing function, such as SHA-1, SHA-2, or SHA-3. The hashed salted credit card number h 307 is then sent 308 to the secure payment system 101.

The customer device 100 also generates 309 a symmetric payment key $k_c$ via a random number generator. This key, $k_c$ 310, is used to encrypt the salted credit card number S|C 305. By encrypting 311 the salted credit card number S|C 305 with the symmetric payment key $k_c$ 310, the encrypted salted credit card number D 312 is produced. The encrypted salted credit card number D 312 is then stored 313 on the customer device 100. The symmetric payment key $k_c$ is sent 314 to the secure payment system 101. Because the encrypted salted credit card number D 312 and the symmetric payment key $k_c$ 310 are stored on isolated computers, an attacker would need to independently gain access to both systems in order to get access to the decoded credit card number C 301.

For security, the plaintext credit card number C 301, the combined credit card number and salt S|C 305, the hashed salted credit card number h 307, and the symmetric payment key $k_c$ 310 are deleted from the volatile and non-volatile memory of the customer device 100. Some combination of the credit card number C 301, the salted hash of the credit card number S|C 305, the encrypted salted credit card number D 312, and the salt S 303 can be sent to the secure payment system 101 to verify, on the secure payment system 101 side, that the hashed salted credit card number h 307 is correct. The secure payment system 101 can also verify the credit card number C 301 with the payment processor 102. The credit card number C 301, the salted credit card number S|C 305, the encrypted salted credit card number D 312, and S 303 should be deleted from the secure payment system 101 after verification.

Authorize a Transaction

Figure 4:
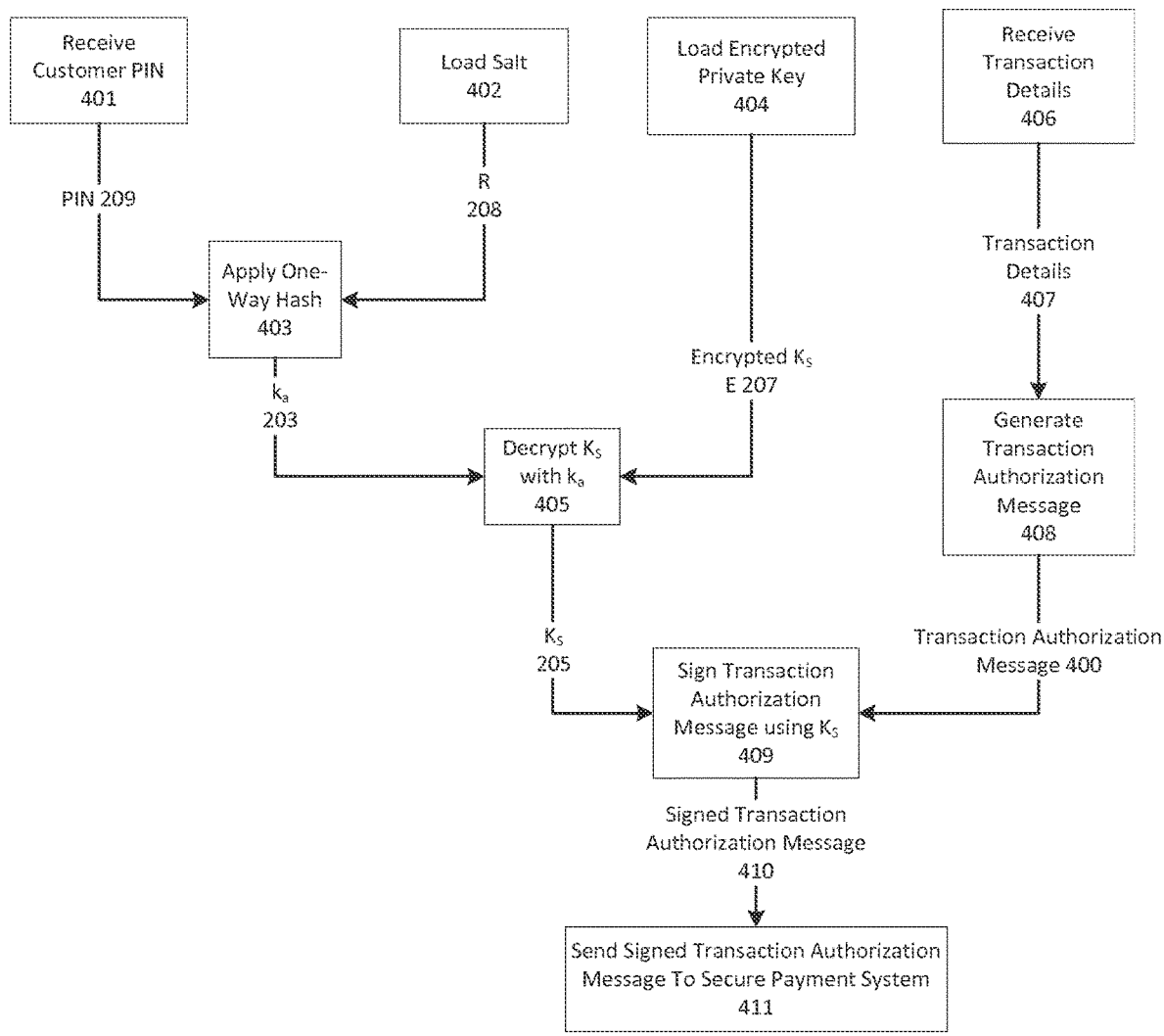
FIG. 4 is a block diagram illustrating a method for recovering the private key from an encrypted version of the private key and using the private key to sign a message in accordance with some embodiments.

Once a transaction is initiated, the customer device 100 signs the transaction using the private key $K_s$ 205. To do so, the customer device 100 recovers the private key $K_S$ 205 in order to digitally sign a transaction authorization message 400. FIG. 4 is a block diagram illustrating a method for recovering the private key $K_S$ 205 on the customer device 100 from the encrypted private key E 207 and using the private key $K_S$ 205 to sign a transaction authorization message 400 in accordance with an embodiment. The PIN 209 is received 401 from the user.

Alternately, if an authenticating input other than a PIN 209 was used during initialization then that authenticating input can be used in place of, or in addition to, a PIN 209. The salt R 208 is loaded 402 by the customer device 100. The one way-hashing function is applied 403 to some combination of R 208 and the PIN 209 to produce the symmetric key $k_\alpha$ 203. The one-way hashing function must be the same as that which was used to produce the symmetric key $k_\alpha$ 203 during initialization. The PIN 209 and R 208 must likewise be combined in the same way as during initialization, to ensure that the symmetric key $k_\alpha$ 203 is consistent with its value during initialization. The PIN 209 or the symmetric key $k_\alpha$ 203 can be verified to check that the PIN 209 was entered correctly. This verification can take the form of hashing the PIN 209 or $k_\alpha$ with another hashing function during initialization and then repeating the step with the new PIN to verify that the input PIN 209 is correct.

The encrypted private key E 207 is loaded 404 and is decrypted 405 using $k_\alpha$ 203 to produce the private key $K_S$ 205.

In an alternate embodiment, rather than encrypting $K_S$ 205 with the symmetric key $k_\alpha$ 203, a device that supports operating system (OS)-managed encrypted non-volatile storage, may use the encrypted storage to store and recover the private key $K_s$ 205 directly, rather than reconstructing it using a PIN 209 or other authentication data. However, even when storing $K_s$ 205 directly through the OS-managed encrypted storage, it might still be desirable to require the user to input a PIN 209, or comparable authentication input. In an embodiment that utilizes an OS-managed encrypted non-volatile storage, $K_s$ 205 can be stored and recovered by the OS, which mitigates the need to encrypt the private key $K_s$ 205 with the symmetric key $k_\alpha$ 203.

Transaction details 407 are received 406 from the secure payment system 101. These transaction details 407 are used to generate 408 the transaction authorization message 400. The transaction authorization message 400 or the transaction details 407 can contain certain details about the transaction, such as an amount of money, a time, a location, the identity of the merchant 103 that will be receiving the funds, or any other information relevant to the details of the transaction. The transaction authorization message 400 can simply be a copy of the transaction details 407. The transaction details 407 can be displayed to the user prior to prompting the user to authorize the transaction by typing in the PIN 209. The transaction details 407 can also be displayed to the user prior to allowing the user to select the credit card with which to process the transaction.

The transaction authorization message 400 is digitally signed 409 with the private key $K_S$ 205 and the signed transaction authorization message 410 is provided to the secure payment system 101. The PIN 209, the symmetric key $k_\alpha$ 203, and the private key $K_S$ 205 can be removed from the memory of the customer device 100 once the signed transaction authorization message 410 is generated.

In some embodiments, the customer device 100 can generate a second pair of public-private keys, $K_{WS}$ and $K_{WP}$, during initialization. As with the first public key $K_P$ 206, the second public key $K_{WP}$ is provided to the secure payment system 101. A public key certificate can be issued for the second public $K_{WP}$ in the same manner as it was for the first public key $K_P$ 206. However, the second private key $K_{WS}$ is not encrypted, but rather stored in plaintext form. When the transaction details 407 fulfill certain requirements, such as the payment amount being less than a certain amount, the second private key $K_{WS}$ is used to sign a transaction authorization message 400 without requiring the user to input a PIN 209. In some embodiments, the requirements for a transaction to be authorized with the second, low-security, private key $K_{WS}$ are specified by the user before a transaction. In some embodiments, the secure payment system 101 determines which of the two private keys with which to sign the transaction authorization message 400. The secure payment system 101 in one configuration determines whether or not to use the second private key $K_{WS}$ based on a perceived risk level of the transaction. The perceived risk level may be generated based on various features of the transaction, such as the amount, merchant, location of merchant, and so forth.

In some embodiments, the public key $K_P$ 206 can be stored on the customer device 100 and used to verify that the value of $K_S$ 205 that is derived by decrypting the encrypted private key E 207 is correct, which will indirectly verify that the user-entered PIN 209 is correct. Alternately, a salted hash can be derived from some combination of the private key $K_S$ 205, the symmetric key $k_\alpha$ 203, and the PIN 209 to verify the PIN 209 entered by the user matches the PIN 209 originally entered by the user.

In some embodiments, a salt can be used when encrypting the private key $K_S$ 205 to provide additional security. This salt can be the salt R 208 which is used to generate the symmetric key $k_\alpha$ 203 or it can be an entirely new salt. Depending on the manner with which the salt is combined with the private key $K_S$ 205, the salt might not need to be stored after it used to generate the encrypted private key E 207. For example, if the salt is appended to the end of the private key $K_S$ 205 prior to encryption, it would not be necessary to store the salt. However, this salt could be stored, or a hash of the salt could be stored, and used to verify that the private key $K_S$ 205 has been correctly decoded.

Provide Credit Card Number to Secure Payment System

Figure 5:
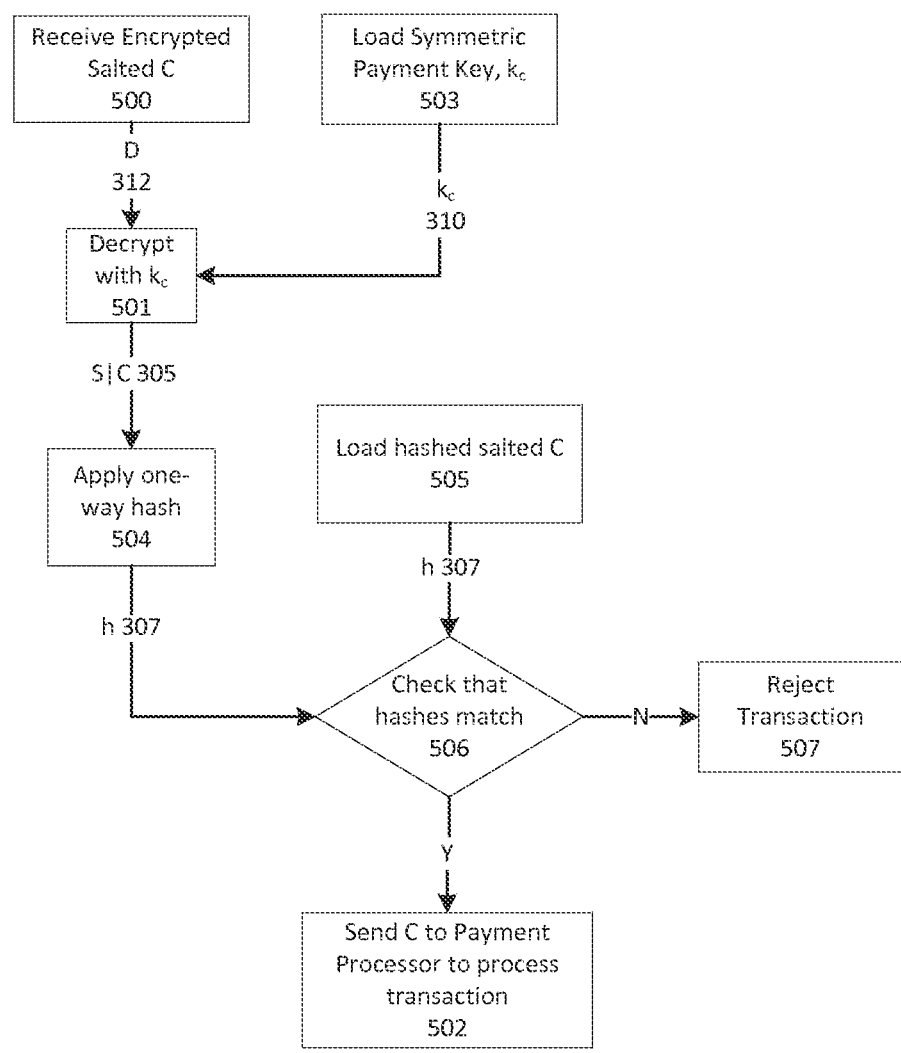
FIG. 5 is a block diagram illustrating a method for receiving, decoding, and verifying an encoded credit card number.

According to some embodiments, the secure payment system 101 does not store the credit card number C 301 in any form. In these embodiments, when a transaction is initiated, the customer device 100 sends the encrypted salted credit card number D 312 to the secure payment system 101, which receives 500 the encrypted salted credit card number D 312. The encrypted salted credit card number D 312 can be sent responsive to the customer entering the correct PIN 209 or other authenticating input. FIG. 5 shows an embodiment in which the secure payment system 101 receives 500 the encrypted salted credit card number D 312 decrypts 501 the credit card number with the symmetric payment key $k_c$ 310, verifies the credit card number C 301 and sends the credit card number C 301 to the payment processor 102 to process 502 the transaction. The secure payment system 101 receives 500 the encrypted salted credit card number D 312 from the customer device 100 and loads 503 the symmetric payment key $k_c$ 310. The salted credit card number S|C 305 is recovered by decrypting 501 the encrypted salted credit card number D 312, with the symmetric payment key $k_c$ 310. A one-way hashing function is then applied 504 to the salted credit card number S|C 305. This one-way hashing function is necessarily the same function used to produce the hashed salted credit card number h 307 during initialization. This hashing function outputs the hashed salted credit card number h 307. The hashed salted credit card number h 307, which was received when the credit card number C 301 was originally initialized, is also loaded 505 from memory. The secure payment system 101 checks 506 that the two hashes match.

If the hashes are not exact matches then the transaction is rejected 507 and an error message can be sent to the customer device 100. However, if the hashes match, the credit card number C 301 is extracted from the salted credit card number S|C 305. In some embodiments, the credit card number C 301 is salted in such a manner that the credit card number C 301 can be easily recovered from the salted credit card number S|C 305 without knowledge of the salt, S 303. In one embodiment, the salted credit card number S|C 305 is the product of appending the credit card number C 301 and S 303 together. Alternately, the credit card number C 301 need not be recoverable from the salted credit card number S|C 305 without knowledge of the Salt S 303. In this case, the salt S 303 should be stored on the secure payment system 101 or transmitted along with the encrypted salted credit card number D 312 whenever a transaction is being processed.

Once the credit card number C 301 is recovered, it can be sent 502 to the payment processor 102 to facilitate the transaction. In some embodiments, the secure payment system 101 only sends the credit card number C 301 to the payment processor 102 after both verifying the credit card number C 301 (by comparing a hash of the salted credit card number S|C 305 to the salted hash of the credit card number h 307) and receiving and verifying the signed transaction authorization message 410. In some embodiments, the encrypted salted credit card number D 312 and the signed transaction authorization message 410 are sent from the customer device 100 to the secure payment system 101 together or in the same SSL session. The credit card number C 301 is deleted from the memory of the secure payment system 101 along with the salted credit card number S|C 305 and the encrypted salted credit card number D 312.

Customer Device

Figure 6:
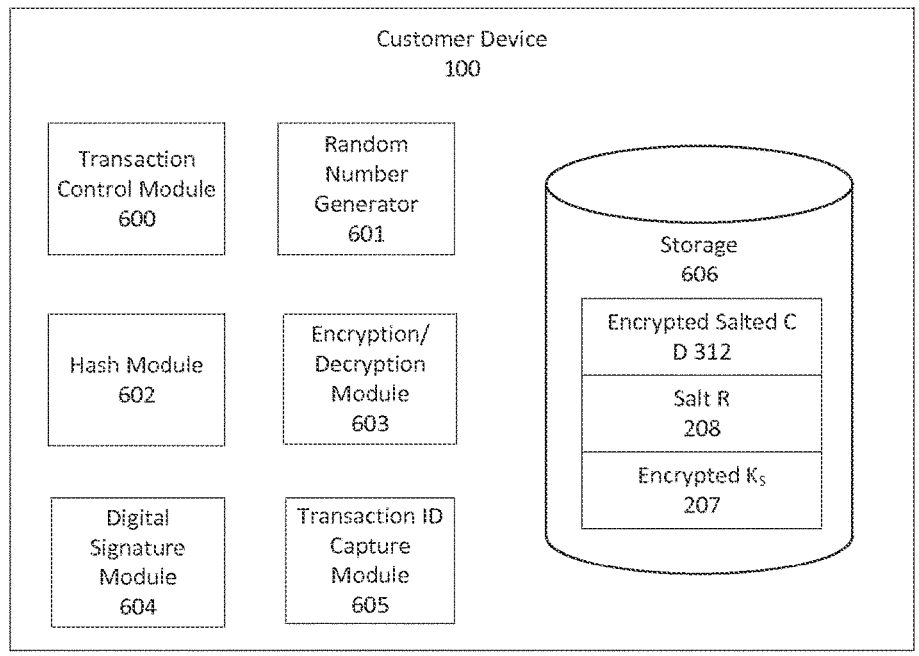
FIG. 6 is a block diagram of a customer device in accordance with some embodiments.

FIG. 6 shows an embodiment of the customer device 100. The customer device 100 comprises a transaction control module 600, a random number generator 601, a hash module 602, an encryption/decryption module 603, a digital signature module 604, a transaction ID capture module 605, and storage 606.

The transaction control module 600 contains the primary logic that facilitates the transaction at a high level. It provides and receives data to and from the other modules on the customer device 100. It also instructs the storage 606 to store or load data. It includes an interface for sending and receiving data through the network 104. The interface for sending and receiving data can utilize transport layer security such as is provided by a SSL (Secure Socket Layer) connection.

The random number generator 601 is a module which generates numbers randomly and can operate via random or pseudo-random processes. In one embodiment, the seed of a cryptographically secure pseudo-random number generator is generated using a hardware random number generator, and the pseudo-random number generator is used to produce numbers. The random number generator 601 can produce elements such as salts, symmetric encryption keys, initialization vectors, and private-public key pairs. The random number generator 601 can be composed of multiple random number generators.

The hash module 602 is capable of mapping inputs to an output of a fixed bit-length, called a hash. The hash module 602 employs a one-way, cryptographically secure hashing function to map inputs to hashes. A hash is a string of bits or characters of a set length. The hash functions implemented by the hash module 602 can take a single input or multiple inputs. In some embodiments, a hash function takes in two inputs: a value and a seed. The hash module can employ a single hash function or multiple hash functions.

The encryption/decryption module 603 is used to encrypt or decrypt data using encryption keys. The encryption/decryption module 603 can encrypt using a symmetric encryption scheme or an asymmetric scheme. The encryption/decryption module can utilize symmetric schemes such as Twofish, Serpent, AES, Blowfish, CAST5, RC4, 3DES, Skipjack, Safer+/++, and IDEA, or any other symmetric encryption algorithm. The asymmetric encryption scheme can comprise RSA, Diffie-Hellman, DSS (Digital Signature Standard), ElGamal, any elliptic curve techniques, Paillier, Cramer-Shoup, YAK, or any other private-public key encryption scheme.

The digital signature module 604 is used to cryptographically sign a message. The digital signature module 604 may use a hashing algorithm and an encryption algorithm to create a signature, and may use the hash module 602 and encryption/decryption module 603 for these respective purposes. The digital signature module 604 signs a message with a private key. The signed message can then be verified by any system with access to a public key, wherein the public key corresponds to the private key. The private key-public key pair can be produced by the random number generator 601. The digital signature module 604 can sign the message via the RSA cryptosystem, the Digital Signature Algorithm (DSA), or any other public-private key cryptosystem suitable for cryptographic signing. In some embodiments, the transaction authorization message is hashed to produce a hash. The hash is then encrypted with the private key, $K_S$ 205. The encrypted hash is the signature and is appended to the transaction authorization message, which is then considered signed. A system with access to the public key can decode the signature portion to receive the hash and hash the message portion to receive a second hash, which will match the first hash if the signature is valid.

The transaction ID capture module 605 is a module used to receive a transaction ID from a merchant 103. One means of receiving a transaction ID from a merchant 103 is by scanning a merchant-provided QR code, where a QR code is a two-dimensional barcode that can be parsed by a machine vision system. In alternate embodiments, the transaction ID capture module 605 reads an alternate type of barcode, or any kind of encoded data format that can be parsed via a machine vision system. In some embodiments, the QR code scanner is able to read multiple types of barcodes. The transaction ID capture module 605 can scan an image, via a digital camera. Scanning an image can constitute capturing a single image or continuously sampling images until the machine vision system is able to decode the data encoded in the QR code. In some embodiments, a QR code is presented to the customer by the merchant 103 via a display screen. The customer device 100 scans the QR code to extract the transaction ID, which it then provides to the secure payment system 101 to receive the transaction details corresponding to the transaction ID. In alternate embodiments, the transaction ID is displayed by the merchant 103 as a number, code, or passphrase via a display screen and the customer types the transaction ID into the customer device 100, which is received by the transaction ID capture module. In another embodiment, the transaction ID capture module 605 receives the transaction ID from the merchant 103 through a short-range communication technology such as NFC, Bluetooth, ANT, or BLE (Bluetooth Low Energy). In some embodiment, when the transaction is taking place in a virtual online marketplace, which is being accessed on the customer device 100 through a browser or shopping application, the transaction ID is provided automatically to the transaction ID capture module 605. In some embodiments, a user can select among a variety of methods to receive a transaction ID.

The storage 606 stores information for the customer device 100. The storage 606 contains non-volatile memory, but can also contain volatile memory. The storage 606 stores the encrypted salted credit card number D 312, a Salt R 208, and the encrypted private key E 207. During a transaction, the encrypted salted credit card number D 312 is sent to the secure payment system 101, where it is decrypted and provided to a payment processor 102 and the salt R 208 along with an authenticating input such as a PIN 209, to generate a symmetric encryption key $k_\alpha$ 203, via the hash module 602. The symmetric encryption key $k_\alpha$ 203 is used to decrypt the encrypted private key E 207, to produce the private key $K_S$ 205. The private key $K_S$ 205 is used to sign a transaction authorization message 400, which establishes that the user authorized the transaction.

Secure Payment System

Figure 7:
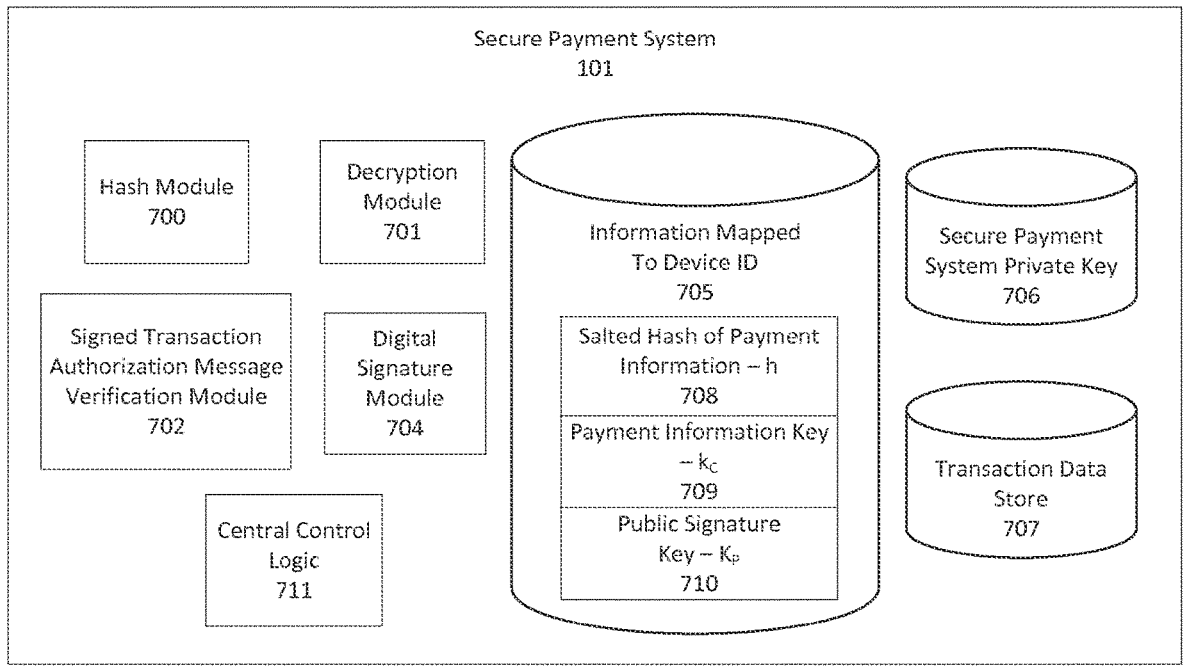
FIG. 7 is a block diagram of a secure payment system in accordance with some embodiments.

FIG. 7 depicts an embodiment of the secure payment system 101, which comprises a hash module 700, a decryption module 701, a signed transaction authorization message verification module 702, a digital signature module 704, information mapped to device ID 705, a secure payment system private key 706, a transaction data store 707, and central control logic 711.

The hash module 700 fulfills a similar function to the hash module 602 of the customer device 100. It implements the same hashing functions as those that are implemented by the customer device 100. The decryption module 701 is used to decrypt the encrypted salted credit card number 312 when it is received from the customer device 100 during a transaction.

The signed transaction authorization message verification module 702 verifies the signed transaction authorization message 410 that is received from the customer device 100 in the course of a transaction. The signed transaction authorization message 410 is verified using the public key $K_P$ 710. In some embodiments, the signed transaction authorization message 410 constitutes a message portion and a signature portion. The signature portion is the result of encrypting a hash with the private key, $K_S$ 205, of the customer device 100, wherein the hash is the hashed message portion. In this embodiment, the public key $K_P$ 710 is used by the decryption module 701 to decode the signature to recover the hash. The message portion of the signed transaction authorization message 410 is hashed with the hash module 700 to produce a second hash. If and only if the signature is correct, then the decoded hash and the second hash will match exactly.

The digital signature module 704 is used to cryptographically sign messages. The messages can be signed with the secure payment system private key 706. The secure payment system 101 can provide the public key that corresponds to the secure payment system private key 706 to the merchant 103 or to customers, which would allow them to verify a message signed by the digital signature module 704. In some embodiments, the secure payment system 101 provides a public key certificate that corresponds to the secure payment system private key 706 and is issued by a trusted certificate authority. In some embodiments, the secure payment system 101 acts as a trusted certificate authority. In one embodiment, the signed transaction authorization message 410, which was signed by the customer device 100, is signed a second time using the digital signature module 704 to create a doubly-signed transaction authorization message. Providing this doubly-signed transaction authorization message to the merchant 103 will establish non-repudiation from both the secure payment system 101 and the customer device 100. In one embodiment, the public key certificate for the customer device's public key $K_P$ 710 is also provided to the merchant 103. In one embodiment, the transaction details 407 that are sent to the customer device 100 are signed with the digital signature module 704. A receipt can be provided to the customer device 100 after the transaction has been processed by the payment processor 102, and this receipt can also be signed by the digital signature module 704.

The information mapped to device ID 705 is stored by the secure payment system 101. In alternate embodiments, the information can be mapped instead to a card ID or a customer ID. The information mapped to device ID 705 can include a salted hash of payment information h 708, a payment information key $k_C$ 709, and a public key $K_P$ 710. The salted hash of payment information h 708 is used to verify that the payment information, such as the credit card number C 301, has been correctly decoded after being received from the customer device 100. The payment information key $k_c$ 709 is used to decrypt the salted encrypted payment information D 312 and obtain the original payment information, such as the credit card number C 301, when the encrypted salted payment information D 312 is received from the customer device 100 during the course of a transaction. The public signature key $K_P$ 710 corresponds to the private signature key $K_S$ 205 of the customer device 100. The public signature key $K_P$ 710 is used to verify signatures originating from the customer device 100. The salted hash of payment information h 708 and the payment information key $k_C$ 709 are provided to the secure payment system 101 by the customer device 100 when the payment information is first initialized. In some embodiments, if multiple instances of payment information are registered by the device then each instance of payment information will correspond to an instance of a salted hash of payment information h 708 and the payment information key $k_C$ 709. For example, if a user has registered two credit cards and a debit card on a device, then the secure payment system 101 will have three instances of salted hashes, $\{h_1, h_2, h_3\}$, and three instances of payment information keys, $\{k_{C_1}, k_{C_2}, k_{C_3}\}$, where each instance of h and $k_C$ is mapped to exactly one instance of a payment information ID. In some embodiments, multiple instances of payment information can share the same value of a payment information key $k_C$ 709, but will each be mapped to a unique hash value.

The transaction data store 707 stores a mapping of transaction IDs to transaction details. When a customer device 100 requests the transaction details 407 for a given transaction ID, the transaction data store 707 is queried to locate these transaction details 407. The transaction data store 707 can also store spatiotemporal information for a transaction, and can require a customer device 100 to include information about its location. The spatiotemporal information can be provided by the merchant 103 along with the transaction details. In some embodiments, if the location is not within some bounded area, then the secure payment system 101 will not send the transaction details to the customer device 100. Also, if the timing of the request for transaction details is not within some timeframe, then the secure payment system 101 can reject the request and not send the transaction details 407. In other embodiments, location and time can be used, along with a transaction ID, to map to different transaction details. For example, a transaction detail request originating in California might map to one set of transaction details, while a transaction detail request originating in Chechnya might map to a different set of transaction details, despite the two requests including the same transaction id. This technique can be used to limit the space of possible transaction IDs or to create a large space of possible transaction ID and spatiotemporal data pairs in order to prevent attackers from viewing the transaction details of someone's transaction by repeatedly guessing transaction IDs.

The central control logic 711 contains the primary logic that facilitates the transaction at a high level. It provides and receives data to and from the other modules on the secure payment system 101. It issues instructions for storing or loading data. It includes an interface for sending and receiving data through the network 104. The interface for sending and receiving data can utilize transport layer security such as is provided by a SSL (Secure Socket Layer) connection.

Initializing the Customer Device and Secure Payment System

Figure 8A:
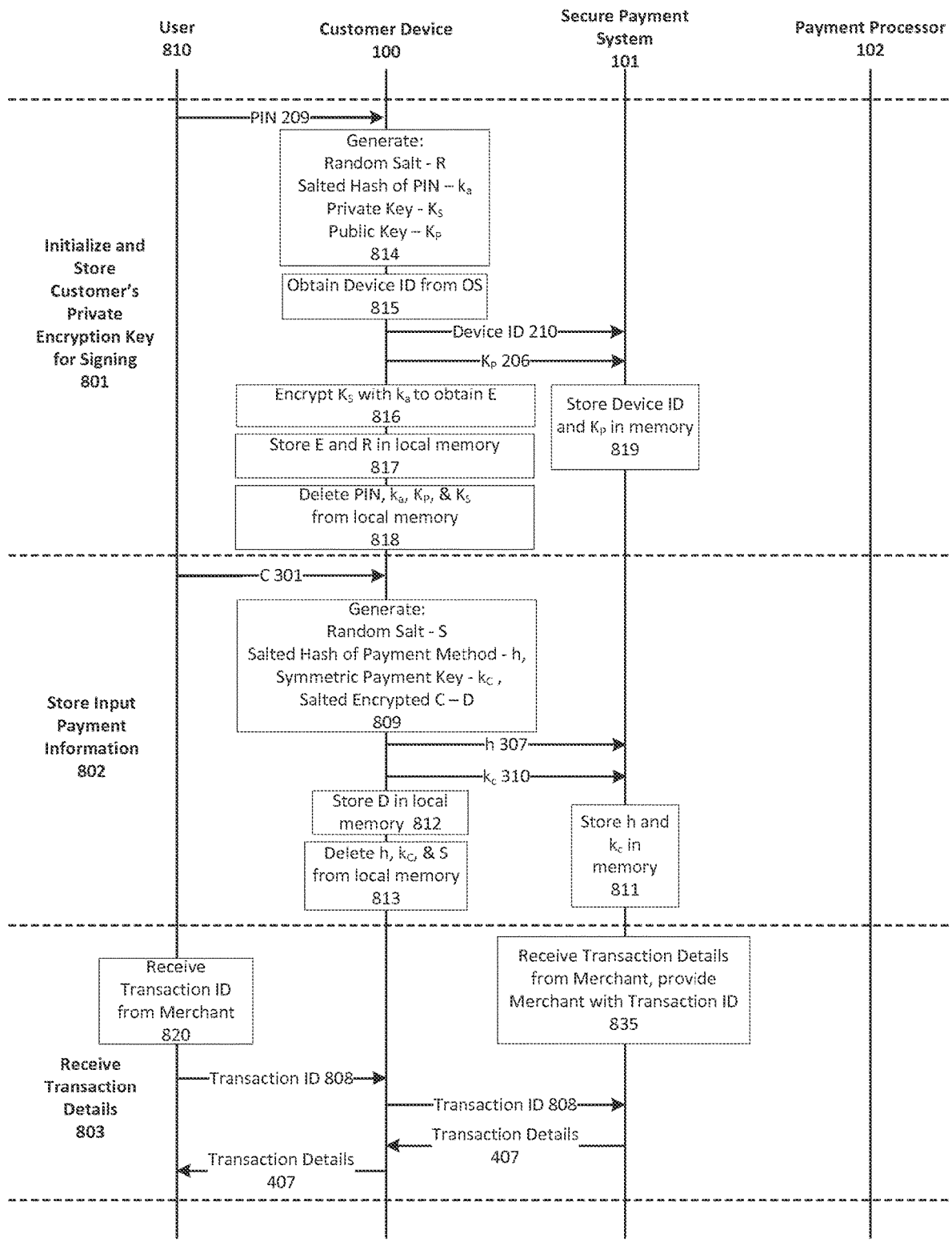
FIGS. 8A and 8B show a timing diagram illustrating the initialization of a secure payment system 101 and a client device and a single transaction being processed by the secure payment system and the customer device 100 in accordance with some embodiments.
Figure 8B:
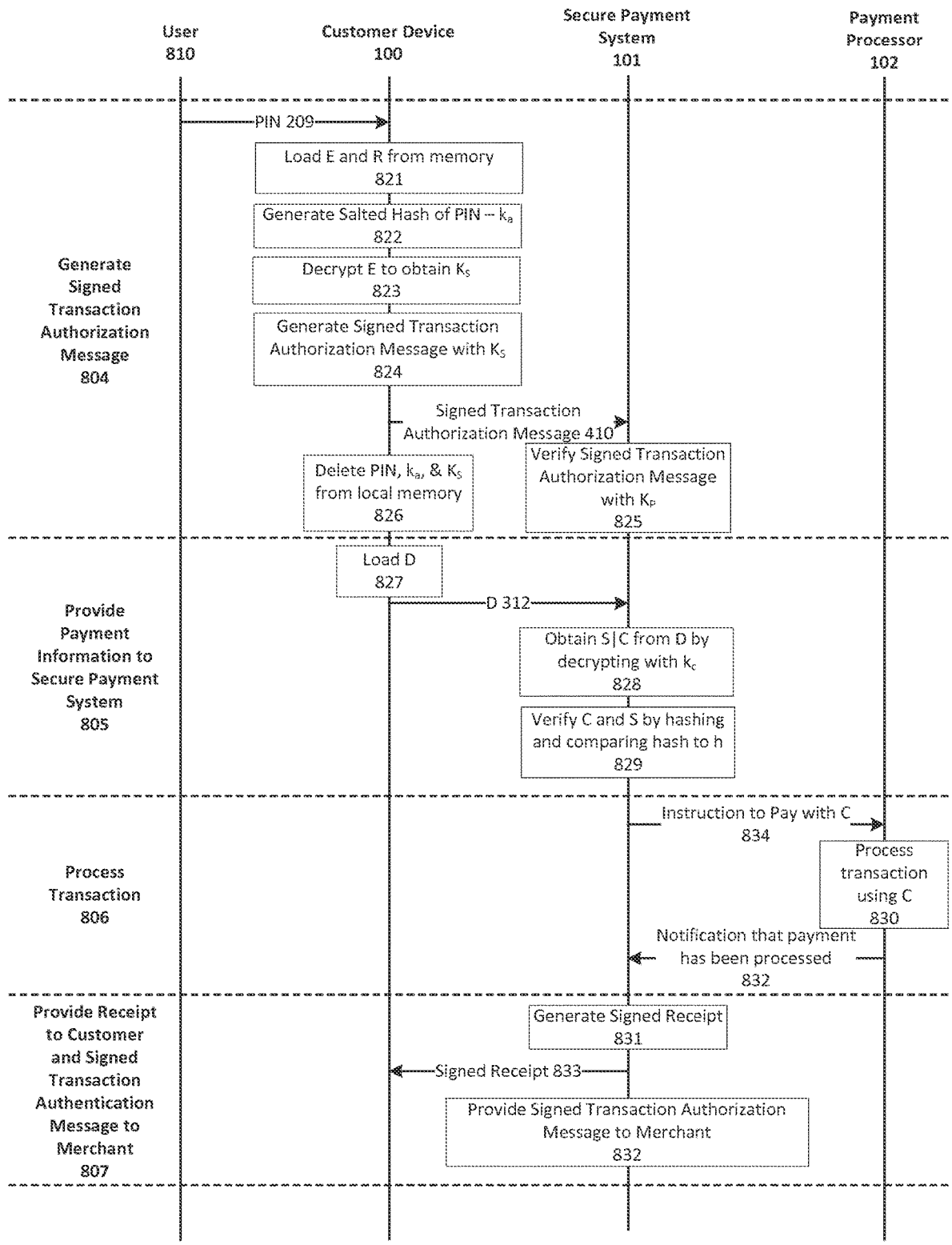

FIGS. 8A and 8B shows a timing diagram illustrating the initialization of a secure payment system 101 and a customer device 100 and a single transaction being processed by the secure payment system 101 and the customer device 100 in accordance with some. FIGS. 8A and 8B show one embodiment, and any ordering of steps is shown for illustrative simplicity only, and, as such, is not intended to limit the scope of the present disclosure to any specific order of steps. Unless otherwise noted, steps shown to take place in a certain order can also take place in a reversed order or simultaneously in alternate embodiments. In FIGS. 8A and 8B, boxes denote functional blocks while arrows denote the transmission of data (although transmission of data can be incorporated into the functional blocks as well). Receiving data from a user can comprise allowing a user to type in the data as an input to the customer device 100. Sending data to a user can comprise displaying information on the screen of the customer device 100.

The timing diagram consists of two main phases: an initialization phase and a transaction phase. The initialization phase happens prior to the transaction phase. The initialization phase comprises initializing 801 and storing the customer's private key for signing and storing 802 input payment information. Although FIGS. 8A and 8B only show one instance of storing 802 the input payment information, this step could happen multiple times for a multiplicity of different payment methods. For example, a customer can be allowed to input multiple credit card, debit card, or bank account numbers. In the embodiment shown in FIGS. 8A and 8B, storing input payment information 802 and initializing and storing the customer's private key for signing 801 are logically isolated, so the input payment information can be stored after initializing the customer's private key, $K_S$ 205, or the two steps can happen simultaneously, via two asynchronous threads.

Initializing 801 and storing the customer's private key for signing involves generating a private key $K_S$ 205 and mapping its corresponding public key $K_P$ 206 to a device ID 210 in the secure payment system 101. A PIN 209, or some comparable authenticating input from the user, is received by the customer device 100 from the user 810. A random salt—R 208, a salted hash of the PIN—$k_\alpha$ 203, a private signing key—$K_S$ 205, and a public key $K_P$ 206 are generated 814 by the customer device 100. The salt R 208 and the private key-public key pair, $K_S$ 205 and $K_P$ 206, are generated by the random number generator 601. The symmetric key $k_\alpha$ 203 is generated via a one-way hashing function that takes in R 208 and the PIN 209 as input. A device ID 210 is also obtained 815 from a request to the operating system. The device ID 210 and the public key $K_P$ 206 are sent to the secure payment system 101, which stores 819 the device ID 210 and the public key $K_P$ 206, so that the public key $K_P$ 206 is mapped to the device ID 210 (or, in some embodiments, a customer ID). The private key $K_S$ 205 is encrypted 816 via a symmetric encryption algorithm to produce the encrypted private key E 207. The encrypted private key E 207 and the salt R 208 are stored 817 in the local memory of the customer device 100, and the PIN 209, the symmetric key $k_\alpha$ 203, $K_P$, and the unencrypted private key $K_S$ 205 are deleted 818 from the local memory of the customer device 100. In some embodiments, initializing 801 and storing the customer's private key $K_S$ 205 is performed prior to storing 802 input payment information and the payment information is linked to the public key $K_P$ 206, the customer ID, or the device ID.

Storing 802 the input payment information comprises storing a means of payment, such as a credit card number C 301 on the customer device 100 in an encrypted form (i.e. encrypted salted credit card number D 312). Input payment information, such as the credit card number C 301, is received on the customer device 100 from the user 810. The customer device 100 generates 809 a random salt S 303, a salted hash of the credit card number h 307, a symmetric payment key $k_C$ 310, and a salted encrypted credit card number D 312. The salt S 303 and the symmetric payment key $k_c$ 310 are generated randomly and can be generated prior to, or while, receiving the credit card number C 301. The salt S 303 and the credit card number C 301 are used to create the salted hash of the credit card number h 307 via a one-way hashing function. The salted encrypted credit card number D 312 is created by encrypting the salted credit card number S|C 305 with the symmetric payment key $k_c$ 310. The salted hash of the credit card number h 307 and the symmetric payment key $k_C$ 310 are sent to the secure payment system 101, which stores 811 them. The encrypted salted credit card number D 312 is stored 812 on the customer device 100 while the salted hash of the credit card number h 307, the symmetric payment key $k_c$ 310, and the salt S 303 are deleted 813 from the volatile and non-volatile memory of the customer device 100. In some embodiments, the encrypted salted credit card number D 312 is sent to the secure payment system 101 to verify that the credit card number C 301 is valid, by, for example, processing a zero-sum transaction.

Processing a Transaction

After the encrypted customer device's private key E 207 and at least one input payment method are initialized, then the customer device 100 and the secure payment system 101 can process a transaction. Some embodiments support delayed transactions and recurring transactions or requiring authorization from multiple customer devices to process a transaction. A transaction can include the following steps: receive 803 transaction details, generate 804 a signed transaction authorization message 410, provide 805 the payment information, such as the credit card number C 301, to the secure payment system 101, process 806 the transaction, and provide 807 the receipt to the customer and the signed transaction authorization message 410 to the merchant 103. Some of these steps can be performed in a different order than is shown in FIGS. 8A and 8B. Also, some steps can be performed simultaneously.

Receiving 803 transaction details 407 constitutes receiving transaction details 407 on a customer device 100 from a merchant 103 through a secure payment system 101. The secure payment system 101 receives 835 transaction details 407 from a merchant 103 and provides the merchant 103 with a transaction ID 808. In some embodiments, the transaction details 407 include itemized billing details. The transaction ID 808 is received 820 via user input into the customer device 100 from the merchant 103 through any number of methods, which are described elsewhere in the specification. The transaction ID 808 is then sent to the secure payment system 101.

The secure payment system 101 responds to the transaction ID 808 with transaction details 407. In the embodiment shown in FIGS. 8A and 8B, these transaction details 407 are the same as the transaction details 407 provided to the secure payment system 101 by the Merchant 103, however in some embodiments, the transaction details 407 can be modified in some way by the secure payment system 101 before being sent to the customer device 100. The transaction details 407 are then displayed to a display of the customer device 100, for the user 810 to review. In some embodiments, the merchant 103 provides the transaction details 407 instead of, or along with, the transaction ID 808, rather than requiring the customer device 100 to fetch the transaction details 407 from the secure payment system 101.

Generating 804 a signed transaction authorization message 410 constitutes creating and sending a message from the customer device 100 to the secure payment system 101 which is signed using a private key $K_S$ 205 that can only be generated by the user. The encrypted private key E 207 and the salt R 208 are loaded 821 from memory. The transaction details 407, received in the previous step 803, can be displayed to the user, and the user can be prompted to authorize the transaction by entering the PIN 209 or some other authenticating input. The PIN 209 is hashed with a salt R 208 to generate 822 the symmetric encryption key $k_\alpha$ 203. The symmetric encryption key $k_\alpha$ 203 is then used to decrypt 823 the encrypted private key E 207 to produce the private key $K_S$ 205. A signed transaction authorization message 410 is generated 824 by using the private key $K_S$ 205 to sign a transaction authorization message 400, which can contain information from the transaction details 407. The signed transaction authorization message 410 is sent to the secure payment system 101, which verifies 825 the signed transaction authorization message 410 with the public key $K_P$ 206. The PIN 209, the symmetric key $k_\alpha$ 203, and the private key $K_S$ 205 are deleted 826 from the memory of the customer device 100.

Providing 805 the payment information to the secure payment system 101 constitutes sending payment information, such as the credit card number C 301, to the secure payment system 101. The encrypted salted payment information D 312 is loaded 827 from memory. The encrypted salted credit card number D 312 is sent to the secure payment system 101, which decrypts the encrypted salted credit card number D 312 using the symmetric payment key $k_C$ 310 to obtain 828 the salted credit card number S|C 305. The salted credit card number S|C 305 can be hashed, and the output hash can be compared to a second hash h 307, stored in memory, which was received when the symmetric payment key $k_c$ 310 was stored. Comparing these hashes will verify 829 that the decoded salted credit card number S|C 305 and thus the credit card number C 301 is correct. The credit card number C 301 can be extracted from the salted credit card number S|C 305.

Processing 806 the transaction constitutes sending 834 an instruction to pay with the credit card number C 301 to the payment processor 102. In some embodiments, the secure payment system 101 only sends the credit card number C 301 to the payment processor 102 after both verifying the credit card number C 301 (by comparing a hash of the salted credit card number S|C 305 to the salted hash of the credit card number h 307) and receiving and verifying the signed transaction authorization message 410. In some embodiments, the encrypted salted credit card number D 312 and the signed transaction authorization message 410 are sent from the customer device 100 to the secure payment system 101 together or in the same SSL session. The payment processor 102 then processes 830 the transaction with whatever financial institution is associated with the credit card number C 301 (e.g., a credit card company or a bank). The payment processor 102 then sends a notification that the payment has been processed 832 to the secure payment system 101.

The secure payment system 101 then provides 807 a signed receipt 833 to the customer device 100 and a signed transaction authorization message to the merchant 103. The signed receipt 833 can include information from the transaction details 407 or information from the payment processor 102 regarding the transaction. This receipt is signed with the secure payment system's private key 706. After generating 831 the signed receipt 833, the signed receipt 833 is sent to the customer device 100. In some embodiments, the signed receipt 833 includes itemized billing details. The signed transaction authorization message 410, which was originally received from the customer device 100, is provided 832 to the merchant 103. In some embodiments, the secure payment system 101 signs the signed transaction authorization message 410 with its private key 706 to produce a doubly-signed transaction authorization message, which is then sent to the Merchant 103. This doubly-signed transaction authorization message establishes nonrepudiation for both the customer device 100 and the secure payment system 101. In some embodiments, the secure payment system 101 provides order details (e.g., the customer's name, address, phone number, or email address) to the merchant 103 along with the doubly-signed transaction authorization message. These order details can be stored in the secure payment system 101 or received from the customer device 100 along with the payment information.

Recurring Payments

Some merchants may need to charge the customer credit card in a recurring fashion, either because they are a subscription business or the customer has given them authorization to store and charge their cards for all future services or goods sold. In some embodiments, a user 810 with a customer device 100 can accept a recurring transaction, which will enable a merchant 103 to initiate recurring payments without needing access to the payment information (e.g., the credit card, C 301) of the customer.

To initialize a recurring payment, the merchant 103 can send a request for a transaction to the secure payment system 101 and specify that this is a request for a recurring payment. When the transaction details 407 are received by the customer device 100, the transaction details 407, including the fact that this transaction is recurring, are displayed to the user 810 and authorization of the recurring transaction is requested. The merchant 103 may optionally provide parameters to define bounds on the transaction, such as a maximum amount that can be charged during any one time or a minimum amount of time between recurring transactions. The user may be allowed to define bounds on the transaction as well. These bounds, other details of the transaction, and an indication that this is a recurring transaction can be displayed to the user 810. Responsive to the user authorizing the transaction, the secure payment system 101 generates a unique token identifying this transaction and sends it to the merchant 103, which stores the token. The original transaction ID 808 itself could be embedded in the token.

The merchant 103 can then request a payment, specifying the exact amount, using the token. In some embodiments, the merchant 103 defines, in the request for the recurring transaction, future times and amounts for a transaction, so that transactions are processed automatically by the secure payment system 101, without requiring input from the merchant 103. Every time the server gets a request from the merchant 103 for a recurring payment, a message is sent to the customer device 100 requesting authorization for the transaction, along with the exact payment amount. If the customer provides authorization by typing a PIN 209 or entering some other authenticating input, the encrypted salted card information D 312 is retrieved and sent to the secure payment system 101 along with a signed transaction authorization message 410. The transaction is then processed by the secure payment system 101 and payment processor 102.

Redirected Payments

An option can be provided for allowing a first user, using a first user device, to request for a second user, using a second user device, to facilitate a transaction. For example, a parent may want to allow a child to pay using the parent's card. In one embodiment, a first user (e.g., a child) initiates a payment by scanning a QR code or other means to obtain a transaction ID. The transaction ID is then routed to the device of the second user (e.g., the child's parent). In some embodiments, the first user can optionally include a message to further describe the transaction. The second user can authorize the transaction and provide a transaction authorization message and encrypted card information, as described elsewhere, which will allow the secure payment system 101 to process the transaction.

This idea can be extended to require approval from more than one person. For example, if the card is a corporate card requiring approval from multiple officials, the request can be routed to multiple officials. In some embodiments, the encrypted credit card information needs to come only from one of the customer devices, but the secure payment system 101 requires consent signature from all of the customer devices, or some subset of the customer devices. In some embodiments, the credit card number C 301, can be split using a secret sharing scheme such as Shamir's Secret Sharing or Blakley's Scheme, in which case each customer device in a group of customer devices is provided a "share" of the card information. At a request from the secure payment system 101, some subset of the customer devices can provide their respective shares which the secure payment system 101 can use to reconstruct the credit card number C 301. In embodiments where location data is used to map transaction IDs to transaction details, the location data can be provided only by the customer device initiating the transaction. In another embodiment, only one user provides the encrypted card number D 312, but the secure payment system 101 will only process the transaction after a certain subset of the users have provided a signed transaction authorization message 410.

Payment Codes

A payment code is the information that is provided to the customer device 100 by the merchant 103 to enable the customer device 100 to authorize a transaction. The payment code can be the same as the transaction ID or it can be a value mapped to the transaction ID by the secure payment system 101. In some embodiments, long payment codes can be problematic. A short string embedded in a QR code can increase the scan fidelity and improve the scan speed. Also, if the user decides to type the payment code, the shorter the code is, the easier and faster the typing process is. Methods for facilitating short payment codes are described herein.

Payment code length can be reduced by requiring the merchant 103 and the customer mobile devices to identify and disclose their geographic location. This can be done using one or more GPS receivers or by viewing an IP address. When location data is required, a payment code needs only to be unique within some geographical area. When the method of obtaining location data is relatively accurate these areas can be relatively small (e.g., with a GPS receiver, the area can have a 60 meter radius). Also, the payment code needs to be unique only for those transactions that are currently being processed. Payment codes may expire after a short time or after a transaction has been processed and reused for another transaction in future.

The merchant 103 may include the location information in the create-transaction request. The secure payment system 101 can generate a transaction code which is unique to some spatiotemporal area and provide it to the merchant 103. The customer device 100 will also include a current location along with its request for transaction details. The secure payment system 101 can use the combination of location data and payment code to map the customer device's request to the correct transaction details.

In some embodiments, an option can be provided to remove spatiotemporal restrictions. A merchant 103 can optionally disable the requirement to include location information with a transaction, which can allow for remote or deferred payments. To facilitate remote or deferred payments, the merchant 103 can specify additional flags while creating the transaction. The flags may indicate whether this payment would be a remote or a deferred payment. If it is a deferred payment, the time until the code should be valid can also be specified. This could enable, for example, a child to call a parent on the phone and give the payment code. The parent could then enter the payment code into a customer device 100, view the payment details, and pay for the child. In another example, a merchant requests a payment code for a deferred transaction. After receiving the payment code, the merchant can provide it, in a form such as a QR code or as a string that that customer must type into the customer device, on a paper bill. The customer, who receives the bill, can authorize the transaction with the payment code. The merchant can request a window of time or a geographic area in which the payment code is valid. Alternately, the merchant can request to remove spatiotemporal restrictions.

In some embodiments, the space of possible payment codes, times, and locations is large compared to the number of valid payment codes, times, and locations. This would prevent a user from viewing payment details spuriously by querying the secure payment system 101 with random payment codes and locations. In some embodiments a first part of the payment code is used to map to the transaction details and the second part of the payment code is used to establish the validity of the payment code. In one embodiment, the first part of the payment code is generated sequentially. In some embodiments, the second part of the payment code is randomly generated and is stored in the secure payment system 101. In an alternate embodiment, the second part of the payment code is a salted keyed hash of the first part of the payment code using a secret key stored at the secure payment system 101 and the secure payment system 101 verifies the hash using the secret key.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, implemented on a mobile device, for authorizing a transaction with payment information, comprising:
  generating a random private-public key pair including an asymmetric private key and an asymmetric public key;
  providing to a secure payment system the asymmetric public key;
  receiving an authenticating input from a user;
  generating, by a one-way hashing function, a symmetric encryption key from the authenticating input;
  encrypting the asymmetric private key using the symmetric encryption key to produce an encrypted private key;
  storing, in a memory of the mobile device, the encrypted private key;
  deleting the asymmetric private key, the asymmetric public key, the authenticating input, and the symmetric encryption key from the memory of the mobile device;
  receiving a request to initiate a transaction and a subsequent authenticating input from the user; and
  responsive to receiving the request to initiate the transaction:
    re-generating, by the one-way hashing function, the symmetric encryption key from the subsequent authenticating input;
    decrypting the encrypted private key with the symmetric encryption key to obtain the asymmetric private key;
    generating a cryptographically signed message using the asymmetric private key, wherein the cryptographically signed message authorizes the transaction; and providing, to the secure payment system, the cryptographically signed message.

2. The method of claim 1, wherein the authenticating input is or is generated from at least one of a PIN, a fingerprint, a facial recognition profile, an eye scan, an unlock pattern, and a password.

3. The method of claim 1, further comprising:
generating a random salt; and
storing the random salt in the memory of the mobile device.

4. The method of claim 1, further comprising storing the asymmetric private key via an encrypted storage system managed by an operating system.

5. The method of claim 1, further comprising verifying the user using a verification scheme, the verification scheme including at least one of:
receiving a call;
sending a text message;
receiving a text message;
receiving a push notification and sending a response to the secure payment system; and
requiring the user to input at least one of a social security number, a portion of a social security number, a bank account PIN, answers to one or more questions regarding a financial history of the user, an address of the user, and a name of the user, and sending the input to the secure payment system.

6. The method of claim 5, wherein the verification scheme used to verify the user includes verifying an identifier, the identifier including at least one of the name of the user, the portion of the social security number, or a device ID, and wherein the secure payment system is further configured to issue a public key certificate which includes the identifier and the asymmetric public key.

7. The method of claim 1, wherein the cryptographically signed message authorizing the transaction can only be generated using the asymmetric private key and further wherein the asymmetric private key is not provided to a device other than the mobile device.

8. The method of claim 1, further comprising receiving a cryptographically signed receipt from the secure payment system, wherein the cryptographically signed receipt is signed by an asymmetric private key known only to the secure payment system.

9. The method of claim 1, wherein receiving the request to initiate the transaction comprises:
receiving a transaction id for the transaction;
providing, to the secure payment system, the transaction id; and
receiving transaction details that correspond to the transaction id from the secure payment system, wherein the transaction details specify an amount of money for the transaction, wherein the transaction details are used to generate the cryptographically signed message.

10. The method of claim 9, wherein receiving the transaction id for the transaction includes at least one of the following:
scanning an image to obtain the transaction id encoded in the image;
receiving the transaction id through a near field communication system;
receiving the transaction id in a communication from another mobile device;
receiving the transaction id via a manual input of the user; and
responsive to a determination that the transaction is being initiated from an online store that the user is accessing from the mobile device, via a network, receiving the transaction id directly through the network.

11. The method of claim 10, further comprising providing to the secure payment system a geographical location, wherein the secure payment system provides transaction details if and only if the geographical location is within a certain geographical area.

12. The method of claim 1, further comprising:
generating a second random private-public key pair including a second asymmetric private key and a second asymmetric public key;
providing to the secure payment system the second asymmetric public key; and
responsive to receiving transaction details wherein certain criteria are met:
generating a second cryptographically signed message using the second asymmetric private key, wherein the second cryptographically signed message authorizes the transaction; and
providing, to the secure payment system, the second cryptographically signed message.

13. The method of claim 12, wherein the certain criteria includes a requirement that a transaction amount be less than a threshold value.

14. A non-transitory computer-readable storage medium comprising executable computer program instructions executable by a processor to perform operations comprising:
generating a random private-public key pair including an asymmetric private key and an asymmetric public key;
providing to a secure payment system the asymmetric public key;
receiving an authenticating input from a user;
generating, by a one-way hashing function, a symmetric encryption key from the authenticating input;
encrypting the asymmetric private key using the symmetric encryption key to produce an encrypted private key;
storing, in a memory of a mobile device, the encrypted private key;
deleting the asymmetric private key, the asymmetric public key, the authenticating input, and the symmetric encryption key from the memory of the mobile device;
receiving a request to initiate a transaction and a subsequent authenticating input from the user; and
responsive to receiving the request to initiate the transaction:
re-generating, by the one-way hashing function, the symmetric encryption key from the subsequent authenticating input;
decrypting the encrypted private key with the symmetric encryption key to obtain the asymmetric private key;
generating a cryptographically signed message using the asymmetric private key, wherein the cryptographically signed message authorizes the transaction; and
providing, to the secure payment system, the cryptographically signed message.

15. The non-transitory computer-readable storage medium of claim 14, wherein the authenticating input is or is generated from at least one of a PIN, a fingerprint, a facial recognition profile, an eye scan, an unlock pattern, and a password.

16. The non-transitory computer-readable storage medium of claim 14,
wherein the operations further comprise:
generating a random salt; and
storing the random salt in the memory of the mobile device.

17. The non-transitory computer-readable storage medium of claim 14, wherein the operations further comprise storing the asymmetric private key via an encrypted storage system managed by an operating system.

18. The non-transitory computer-readable storage medium of claim 14, wherein the operations further comprise verifying the user using a verification scheme, the verification scheme including at least one of:
receiving a call;
sending a text message;
receiving a text message;
receiving a push notification and sending a response to the secure payment system; and
requiring the user to input at least one of a social security number, a portion of a social security number, a bank account PIN, answers to one or more questions regarding a financial history of the user, an address of the user, and a name of the user, and sending the input to the secure payment system.

19. The non-transitory computer-readable storage medium of claim 18, wherein the verification scheme used to verify the user includes verifying an identifier, the identifier including at least one of the name of the user, the portion of the social security number, or a device ID, and wherein the secure payment system is further configured to issue a public key certificate which includes the identifier and the asymmetric public key.

20. The non-transitory computer-readable storage medium of claim 14, wherein the cryptographically signed message authorizing the transaction can only be generated using the asymmetric private key and further wherein the asymmetric private key is not provided to a device other than the mobile device.

21. The non-transitory computer-readable storage medium of claim 14, wherein the operations further comprise receiving a cryptographically signed receipt from the secure payment system, wherein the cryptographically signed receipt is signed by an asymmetric private key known only to the secure payment system.

22. The non-transitory computer-readable storage medium of claim 14, wherein receiving the request to initiate the transaction further comprises:
receiving a transaction id for the transaction;
providing, to the secure payment system, the transaction id; and
receiving transaction details that correspond to the transaction id from the secure payment system, wherein the transaction details specify an amount of money for the transaction, wherein the transaction details are used to generate the cryptographically signed message.

23. The non-transitory computer-readable storage medium of claim 22, wherein receiving the transaction id for the transaction includes at least one of the following:
scanning an image to obtain the transaction id encoded in the image;
receiving the transaction id through a near field communication system;
receiving the transaction id in a communication from another mobile device;
receiving the transaction id via a manual input of the user; and
responsive to a determination that the transaction is being initiated from an online store that the user is accessing from the mobile device, via a network, receiving the transaction id directly through the network.

24. The non-transitory computer-readable storage medium of claim 23, wherein the operations further comprise providing to the secure payment system a geographical location, wherein the secure payment system provides transaction details if and only if the geographical location is within a certain geographical area.

25. The non-transitory computer-readable storage medium of claim 14, wherein the operations further comprise:
generating a second random private-public key pair including a second asymmetric private key and a second asymmetric public key;
providing to the secure payment system the second asymmetric public key; and
responsive to receiving transaction details wherein certain criteria are met:
generating a second cryptographically signed message using the second asymmetric private key, wherein the second cryptographically signed message authorizes the transaction; and
providing, to the secure payment system, the second cryptographically signed message.

26. A method, implemented on a mobile device, for authorizing a transaction with payment information, comprising:
generating a random private-public key pair including an asymmetric private key and an asymmetric public key;
providing to a secure payment system the asymmetric public key;
receiving an authenticating input from a user;
generating, by a one-way hashing function, a symmetric encryption key from the authenticating input;
encrypting the asymmetric private key using the symmetric encryption key to produce an encrypted private key;
storing, in a memory of the mobile device, the encrypted private key;
deleting the asymmetric private key, the asymmetric public key, the authenticating input, and the symmetric encryption key from the memory of the mobile device;
receiving a request including a transaction id of the transaction for authorization;
providing, to the secure payment system, the transaction id; and
responsive to receiving transaction details that correspond to the transaction id from the secure payment system:
receiving a subsequent authenticating input from the user;
re-generating, by the one-way hashing function, the symmetric encryption key from the subsequent authenticating input;
decrypting the encrypted private key with the symmetric encryption key to obtain the asymmetric private key;
generating a cryptographically signed message using the asymmetric private key and the transaction details, wherein the cryptographically signed message authorizes the transaction; and
providing, to the secure payment system, the cryptographically signed message.

27. A non-transitory computer-readable storage medium comprising executable computer program instructions executable by a processor to perform operations comprising:
- generating a random private-public key pair including an asymmetric private key and an asymmetric public key;
- providing to a secure payment system the asymmetric public key;
- receiving an authenticating input from a user;
- generating, by a one-way hashing function, a symmetric encryption key from the authenticating input;
- encrypting the asymmetric private key using the symmetric encryption key to produce an encrypted private key;
- storing, in a memory of a mobile device, the encrypted private key;
- deleting the asymmetric private key, the asymmetric public key, the authenticating input, and the symmetric encryption key from the memory of the mobile device;
- receiving a request including a transaction id of a transaction for authorization;
- providing, to the secure payment system, the transaction id; and
- responsive to receiving transaction details that correspond to the transaction id from the secure payment system:
  - receiving a subsequent authenticating input from the user;
  - re-generating, by the one-way hashing function, the symmetric encryption key from the subsequent authenticating input;
  - decrypting the encrypted private key with the symmetric encryption key to obtain the asymmetric private key;
  - generating a cryptographically signed message using the asymmetric private key and the transaction details, wherein the cryptographically signed message authorizes the transaction; and
  - providing, to the secure payment system, the cryptographically signed message.

* * * * *